US012583637B2

(12) United States Patent
Goehlich

(10) Patent No.: US 12,583,637 B2
(45) Date of Patent: Mar. 24, 2026

(54) MULTI-USE PLATFORM FOR A MOBILE ROBOT

(71) Applicant: Airbus Operations GmbH, Hamburg (DE)

(72) Inventor: Robert Alexander Goehlich, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 19/169,223

(22) Filed: Apr. 3, 2025

(65) Prior Publication Data

US 2025/0320007 A1 Oct. 16, 2025

(30) Foreign Application Priority Data

Apr. 11, 2024 (EP) ..................................... 24169673

(51) Int. Cl.
*B64U 70/93* (2023.01)
*B25J 5/00* (2006.01)
*B64U 80/86* (2023.01)
*B66F 7/02* (2006.01)

(52) U.S. Cl.
CPC ................ *B64U 70/93* (2023.01); *B25J 5/00* (2013.01); *B64U 80/86* (2023.01); *B66F 7/02* (2013.01)

(58) Field of Classification Search
CPC . B64U 70/93; B64U 80/86; B25J 5/00; B66F 7/02
See application file for complete search history.

(56) References Cited

U.S. PATENT DOCUMENTS

| | | | |
|---|---|---|---|
| 2016/0009413 A1* | 1/2016 | Lee ........................... | G08G 5/57 |
| | | | 701/16 |
| 2020/0033846 A1* | 1/2020 | Buyse .................. | G05D 1/0022 |
| 2021/0229805 A1* | 7/2021 | Getman .................. | B64C 27/52 |
| 2022/0119103 A1* | 4/2022 | Braun .................... | B25J 9/1687 |

FOREIGN PATENT DOCUMENTS

WO 2020226591 A1 11/2020

OTHER PUBLICATIONS

European Search Report for corresponding European Patent Application No. 24169673.1 dated Oct. 9, 2024.

* cited by examiner

*Primary Examiner* — Justin M Benedik
(74) *Attorney, Agent, or Firm* — Greer Burns & Crain Ltd.

(57) ABSTRACT

A multi-use platform for a mobile robot is provided. The multi-use platform includes a first platform element, and a second platform element. The first platform element is fixedly attachable to a robot body of the mobile robot. The second platform element is movable relative to the first platform element between at least a first position and a second position. In the first position, the second platform element and the first platform element together build a flat surface, and in the second position, the first platform element and the second platform element together build a functional arrangement. Further, an autonomous mobile robot is provided that includes a corresponding multi-use platform.

17 Claims, 6 Drawing Sheets

MULTI-USE PLATFORM FOR A MOBILE ROBOT

CROSS-REFERENCES TO RELATED APPLICATIONS

This application claims the benefit of European Patent Application Number 24169673.1 filed on Apr. 11, 2024, the entire disclosures of which are incorporated herein by way of reference.

FIELD OF THE INVENTION

The present disclosure relates to a multi-use platform for a mobile robot and to a mobile robot comprising such multi-use platform.

BACKGROUND OF THE INVENTION

In environments such as production environments or maintenance environments, in particular for aircraft and spacecraft, multiple work tasks have to be performed on a fuselage or other part of the aircraft or spacecraft. For example, the fuselage of the aircraft and spacecraft often-times is inspected using optical scanners. Such inspections are performed in order to detect undesirable anomalies such as dents, rivet pull-ins, out-of-contour deformations, blend-outs, and scratches. For this, the optical scanners are usually arranged within a handheld unit and an operator of the unit scans the surface of the fuselage with the handheld unit in a grid or matrix like pattern. A further example for working tasks on an aircraft or spacecraft is the attachment of rivets in order to fix a skin to stringers and frames.

A lot of these work tasks are performed manually by human personnel. However, mobile robots and, in particular, autonomous mobile robots may also be used for such tasks. For example, a mobile robot can have a robot body that can move over a ground surface and has a robot arm that carries out certain tasks, such as optical scans of the fuselage or riveting operations. For each of these operations, a corre-sponding end effector has to be attached to the robot arm, usually manually. In some cases, such switches of end effectors may need to occur rather often. For example, for optical quality scans of a surface to detect undesirable anomalies, for different kinds of anomalies different optical scanners are necessary to detect the corresponding anoma-lies, which requires switching between different scanners (end effectors) in order to detect any conceivable anomaly. Even if the mobile robot would be able to automatically switch end effectors, this would be time consuming, since, for example, the mobile robot would need to get the corre-sponding end effectors from a storage space and therefore travel between the workplace and the storage space.

SUMMARY OF THE INVENTION

Accordingly, it is an objective to provide a multi-use platform for a mobile robot that allows to quickly switch end effectors of a robot arm while simultaneously fulfilling other functionalities.

According to a first aspect, a multi-use platform for a mobile robot is provided. The multi-use platform comprises a first platform element and a second platform element. The first platform element is fixedly attachable to a robot body of the mobile robot. The second platform element is movable relative to the first platform element between at least a first position and a second position. In the first position, the second platform element and the first platform element together build a flat surface. In the second position, the first platform element and the second platform element together build a functional arrangement.

The multi-use platform is a convertible and versatile platform for a mobile robot that serves multiple purposes (hence the term "multi-use"). The multi-use platform can, in particular, be arranged on top of the robot body and can be converted between a first configuration (first position) and a second configuration (second position). The multi-use plat-form may, for example, be attached to the robot body of the mobile robot by means of corresponding beams or other connecting and attachment elements, such that the multi-use platform is vertically distanced from the top of the robot body, in order to provide enough room between the multi-use platform and the robot body (or rather a top surface of it) for the functional arrangement in the second position.

In one configuration (first position), the multi-use plat-form may provide a substantially closed flat surface that can, for example, be used as a landing platform for a drone, a storage surface for a robot arm of the mobile robot, or for any other suitable application. For example, if in the vicinity of the mobile robot a human worker performs certain tasks, the flat surface on the multi-use platform may also be used for temporarily placing tools onto it by the human worker. However, the main purpose is for the multi-use platform to be exclusively used by the mobile robot. A landing platform for a drone is, in particular, useful because an associated drone for the mobile robot may, for example, be in com-munication with an autonomous mobile robot and may assist in certain tasks. For example, the mobile robot may carry such a drone and start it, when necessary, for example for assisting in navigating the mobile robot or for carrying out some operations in greater heights, such as performing scans on the top of a fuselage of an aircraft, where the mobile robot cannot be used. Such a drone may use LiDAR scanners for scanning a landing platform prior to landing. For such scans, a flat surface of the landing platform that is as smooth as possible is desirable in order to avoid that the drone aborts a landing approach.

The multi-use platform can be converted from this first configuration (in the first position) into any suitable second configuration (second position) that builds a functional arrangement, in particular for usage by the mobile robot. For example, in the second position, the second platform ele-ment may be lowered into an underlying space or com-pletely removed (either manually or autonomously by the mobile robot) for building a transport box between the first platform element and the second platform element that can be used by the mobile robot (or rather a robot arm of the mobile robot) to temporarily store items such as tools, work equipment, working materials (e.g., rivets, screws, etc.), or any other items.

In another example, a bottom surface of the second platform element that is opposite a top surface, may be equipped with holding elements for work tools, end effec-tors, etc., for a robot arm of the mobile robot. The bottom surface could also be equipped with closed transport con-tainers (e.g., for items that can be used by the mobile robot) or the bottom surface may have corresponding holding elements for attaching such transport boxes. In this example, in the second position, the second platform element would be rotated such that the bottom surface comes to the top and is accessible from the top by a robot arm of the mobile robot. This would correspond to the second position and the functional arrangement would be the holding elements together with the work tools or end effectors.

Further, instead of a dedicated second platform element, the second platform element may at least partially also directly be built by one or more tools or end effectors for the robot arm which have a flat backside or surface which, when the tools or end effectors are stored within the multi-use platform element, builds the flat surface. In such an example, the first position would correspond to a state, in which these tools or end effectors are stored within the multi-use platform, such that the flat surface (which may, for example, be used as a drone platform) is built. Strictly speaking, the second position would then at least partially be the same as the first position. The functional arrangement and the flat surface would be built simultaneously because the tools or end effectors themselves provide the flat surface and can be engaged by the robot arm and therefore also provide a functional arrangement. However, it is also possible that the emerging cavity when the tool or end effector is removed from the multi-use platform can be used as a transport box or similar.

It should be appreciated that the above examples are non-limiting. The functional arrangement in the second position can, in principle, be any suitable and conceivable functional arrangement.

The mobile robot for which the multi-use platform can be used may, in particular, be an at least partially autonomous mobile robot. A fully autonomous mobile robot would perform any task without any intervention of a user or human operator (apart from, for example, assigning the autonomous mobile robot a certain task, adjusting settings, etc.). In particular, a fully autonomous mobile robot also can navigate and move within an environment, for example using a corresponding navigation system, without any intervention, such that it can travel between different workplaces and perform the assigned tasks. A partially autonomous mobile robot could, for example, be a mobile robot that in general is moveable (e.g., by a corresponding drive unit such as an electric motor and wheels that propel the robot body over a ground surface) and that may automatically perform certain tasks, once it is positioned at the corresponding workplace. However, such a partially autonomous mobile robot may not be able to automatically navigate and travel between different workplaces and may need to be driven between such workplaces manually by a human operator. However, these are just examples. The multi-use platform may be used with any mobile robot, be it fully autonomous, partially autonomous, or not autonomous at all.

According to an embodiment, the first platform element is an outer platform element, and the second platform element is an inner platform element, such that the outer platform element surrounds the inner platform element.

In particular, the first platform element may be a thin substantially flat and circumferentially closed element, that surrounds the second element like a surrounding band or ribbon. However, the first platform element may also not be a thin element but may also have a substantial dimension/thickness in the vertical direction. In particular, it is also conceivable, that the first platform element itself serves as a connection means to the robot body, such that no additional beams or other connecting elements are necessary for coupling the multi-use platform to the robot body. In general, in the mounted state, i.e., when the multi-use platform is attached to the robot body, the first platform element is immovable, and the second platform element is arranged within the first platform element and is surrounded by the first platform element. Only the second platform element is moved relative to the first platform element when the multi-use platform is converted between the first position and the second position, and not vice-versa.

According to a further embodiment, the first platform element comprises enlarged corner sections, such that the first platform element builds a landing surface for a drone that is configured to support feet of the drone.

For example, the first platform element may, in general, have a rather small surrounding area in order to save space. However, corners of the first platform elements may be enlarged, such that the area in the corner section is large enough for the feet of a drone, such that the drone can land on the multi-use platform when it is in the first position providing the flat surface.

According to a further embodiment, the second platform element is removable.

The second platform element may, for example, be removable manually or may comprise gripper receptacles for the robot arm, as described below. In particular, the second platform element may be connected/locked to the multi-use platform when not removed. If the second platform element only is a flat element that can be removed to (e.g.) build a cavity or transport box, the second platform element may be connected to the first platform element by corresponding connections. In order to manually remove the second platform element, these connections can be disengaged, and the second platform element can then be removed manually or by the robot arm. If the second platform element, as in some embodiments, is, for example, lowerable, rotatable, pivotable or otherwise displaceable with regard to the first platform element, the corresponding connection element providing the corresponding displacement functionality (e.g., as described below: rail and wheel, rotatable connection, hinges, etc.) can be released/disengaged such that the second platform element can be removed, either manually or by the robot.

According to a further embodiment, the second platform element comprises at least one gripper receptacle which is configured to be engaged by a robot arm of the autonomous mobile robot to remove the second platform element by the robot arm.

The gripper receptacle may, for example, be a corresponding hole or other corresponding element, that can be engaged by the robot arm in order to remove the second platform element. For example, the gripper receptacle could be a through hole that can be engaged by the robot arm by inserting a corresponding pin of the robot arm, wherein the pin has a selective retention mechanism, e.g., in the form of a movable locking hook, to name just one non-limiting example. In certain embodiments, the gripper receptacle may, for example, also be configured to automatically release a connection element for a displaceable second platform element (e.g., lowerable, rotatable, etc.), as described above. This allows it to fully automatically remove the second platform element by the robot arm, even if the second platform element comprises a displacement function with regard to the first platform element.

According to a further embodiment, the second platform element is a two-part element having a first sub-element and a second sub-element that are each hingedly connected to the first platform element, such that the first sub-element and the second sub-element can be pivoted between a closed position and an open position. The closed position corresponds to the first position of the second platform element. The open position corresponds to the second position of the second platform element.

The second platform-element may, for example, be evenly split in two parts in the form of flaps that build the first sub-element and the second sub-element. These flaps can each be pivoted around a hinge downward and upward. In particular, when the second platform element in total is square or rectangular in shape and therefore the corresponding hole/recess in the first platform element also has a matching shape, the two hinges may be arranged at opposite inner edges of the square or rectangular recess, such that the second platform element can be opened and closed in a door like manner by pivoting the first sub-element and the second sub-element around the corresponding hinge. In the first position, the first and second sub-elements would both be in the upward/closed position, such that both sub-elements (i.e., flaps or door leaves) and the first platform element lie in a common plane and build the flat surface. In the second position, the sub-elements are pivoted downward and therefore provide a cavity within the first platform element, which can, for example, be used as a transport or logistics box. This corresponds to the functional arrangement in the second position.

The first sub-element and the second sub-element may also have a locking mechanism for holding the first and second sub-elements in place when in the first position by locking the sub-elements to the first platform element. Such a locking mechanism may be embodied in any suitable and conceivable way.

According to a further embodiment, the multi-use platform further comprises an electrically operable pivoting actuator. The first sub-element and the second sub-element are connected to the electrically operable pivoting actuator. The electrically operable pivoting actuator is configured to selectively move the first sub-element and the second sub-element between the closed position and the open position.

The electrically operable pivoting actuator may, for example, be an electric motor that is configured to pivot each of the hinges around the corresponding pivoting axis in order to open or close the first and second sub-elements by pivoting them between those positions. This allows for the mobile robot to automatically open or close the first and second sub-elements and convert the multi-use platform between the configurations in the first position and the second position.

According to a further embodiment, the second platform element has a first side and a second side opposite to the first side. The first side is a flat side, which, in the first position, together with the first platform element builds the flat surface. The second side comprises holding elements for different end effectors.

In particular, the holding elements allow to fix different end effectors for the robot arm onto them, such that the end effectors are fixed to the second side, even when the second side is facing downward, as in the first position. In this way, the space between the robot body and the multi-use platform can be used as a storing space for multiple end effectors. When in the first position, the flat surface can, for example, be used as a landing platform for a drone. When the mobile robot needs another end effector as the one currently mounted onto the robot arm, the second platform element can be turned around, such that the second side is facing upwards and the stored end effectors that are mounted to the holding elements are accessible by the robot arm. For example, one of the holding elements may be empty. When the mobile robot needs another end effector, the currently mounted end effector can be placed into the empty holding element by the robot arm and another end effector can be picked up by the robot arm. In order to release the new end effector from the corresponding holding element, the robot arm may simultaneously actuate a release mechanism.

If the second platform element is in the first position, when another end effector is needed, the second platform element is first turned around to make the stored end effectors accessible. After the robot arm has picked up another end effector, optionally the second platform element may be turned around again to provide the flat surface.

Turning around of the second platform element may be done manually by a human operator, by the mobile robot, or automatically, e.g., by a rotating device, as described herein further below with regard to an embodiment.

According to a further embodiment, the second platform element is lowerable with regard to the first platform element. When in the second position, the second platform element is in a lowered position, such that a transport box is built between the first platform element and the second platform element.

In particular, the multi-use platform may be fixedly attachable on top of the robot such that the surface of the multi-use platform is arranged at a sufficient vertical distance from the robot body to allow the second platform element to be lowered with regard to the first platform element. The second platform element may, for example, be connected to the first platform element by corresponding rails or tracks that run vertically between the first position and the second position and that are arranged on at least two edges of the second platform element. Such rails or tracks may, for example, be toothed rails for engaging with corresponding toothed wheels or flat rails for engaging with corresponding flat wheels. The second platform element may, for example, comprise such toothed or flat wheels that engage the rails or tracks, such that the second platform can travel along the rails or tracks vertically and can therefore be lowered and lifted by means of the corresponding wheels. Such wheels may be actuated manually (e.g., by a crank handle or similar, which may also be actuatable by the robot arm) or electrically by means of a corresponding actuator, as described further below with regard to an embodiment.

In general, both, the first platform element and the second platform element have a substantially flat top surface, such that they together build the flat surface in the first position (that can, for example, be used as a drone landing platform). The word "substantially" indicates that the surface of at least the second platform element may nevertheless comprise, for example, gripper receptacles or other functional elements for interacting with the mobile robot, such that the second platform element can, for example, be gripped by a robot arm of the mobile robot in certain embodiments. This may, for example, be useful to remove the second platform element completely from the multi-use platform, as described further above. However, it has to be ensured that such gripper receptacles or any other functional elements do not interfere with the intended purpose of the flat surface, for example as a drone landing platform. This may include that such gripper receptacles (or any other functional elements in the flat surface) do, for example, not interfere with a drone's possibility to scan the surface by a LiDAR scanner or similar in order to approach the flat surface and land on it.

According to a further embodiment, the multi-use platform further comprises an electrically operable linear actuator which is configured for selectively lowering and lifting the second platform element between the first position and the second position.

The linear actuator may, for example, be an electric motor that is configured to drive the wheels engaging the rails or tracks described above in order to lower and lift the second platform element. However, the linear actuator may also, for example, be a telescopic push rod or another actuator that does not directly engage with a rail or similar coupling mechanism but that instead is connected to a bottom surface of the second platform element and pushes or pulls the second platform element into the desired position. The term linear actuator refers to any actuator, that is configured to linearly displace the second platform element upwards and downwards, independent of the specific implementation of the linear actuator.

According to a further embodiment, the second platform element comprises at least one end effector for a robot arm. Each of the at least one end effector has a flat backside which, in the first position, together with the first platform element build the flat surface.

For example, the first platform element may be a surrounding outer platform element, as described above. An inner edge of the surrounding outer platform element may be configured to hold a base of at least one end effector. For example, the inner edge may have a stepped contour, that is dimensioned so that an edge on the backside of the end effector can rest onto the stepped contour such that, when the end effector rests onto the edge, the backside of the end effector and the top surface of the first platform element together build the flat surface. This would be the first position of the multi-use platform. Since the backside of the end effector in this position faces upwardly, the robot arm can pick up the end effector and remove it from the multi-use platform element, such that a cavity in the multi-use platform element is revealed and can, for example, be used as storage space. The first platform element may also be configured to hold more than one end effector in this way, for example four end effectors in a grid, that together build the flat surface when they are inserted into the first platform element.

According to a further embodiment, the flat backside of the at least one end effector comprises locking elements to enable the robot arm to automatically pick up the end effector and attach it to the robot arm.

Such locking elements may be regular attachment mechanisms of the end effector for attaching it to the robot arm. However, the locking elements are configured such that the backside builds a substantially flat surface and, in particular, does not have any protruding elements.

According to a further embodiment, the second platform element is rotatably connected to the first platform element by a rotating device that is configured to rotate the second platform element between the first position and the second position.

For example, the second platform element may be coupled rotatably around a rotational axis that runs through the center of the second platform element to the first platform element. The imaginary line built by the rotational axis separates the second platform element into two equally spaced parts, such that the second platform element can be symmetrically rotated around the rotational axis. The second platform element can be rotated around the rotational axis, such that it can be turned around between the first position, in which a first, flat, surface of the second platform element is arranged on the top, and the second position, in which the other side of the second platform element (for example carrying holding elements for end effectors) is arranged on the top and accessible by the robot arm.

According to a further embodiment, the rotating device is electrically operable for selectively rotating the second platform element between the first position and the second position.

For example, the corresponding rotating device can be an actuator such as an electric motor that is configured to rotate the second platform element around the rotational axis.

According to a second aspect, a mobile robot is provided. The mobile robot comprises a robot body, a drive unit for moving the robot body, a robot arm configurable with different end effectors and attached to the robot body, and a multi-use platform according to any one of the embodiments described herein. The multi-use platform is arranged on the robot body in such a manner that the multi-use platform is reachable by the robot arm.

The mobile robot may, for example, be a partially autonomous mobile robot, a fully autonomous mobile robot, or any other mobile robot, as described further above. The multi-use platform may, for example, be attached at a vertical distance on a top side to the robot body, for example together with and next to the robot arm. This allows the robot arm to reach the multi-use platform. The multi-use platform may be configured according to any one of the embodiments described herein and may comprise any of the features described herein with regard to the multi-use platform.

BRIEF DESCRIPTION OF THE DRAWINGS

In the following, exemplary embodiments are described in more detail having regard to the attached figures. The illustrations are schematic and not to scale. Identical reference signs refer to identical or similar elements.

DETAILED DESCRIPTION OF THE PREFERRED EMBODIMENTS

Figure 1:
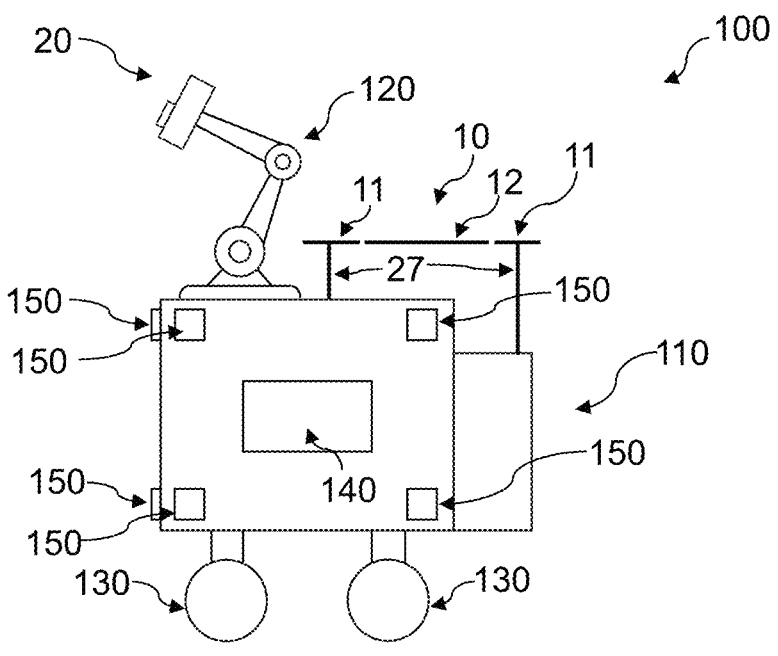
FIG. 1 is a highly schematic representation of a mobile robot comprising a multi-use platform.

FIG. 1 shows a highly schematic representation of a mobile robot 100. The mobile robot 100 may, in particular, be an autonomous mobile robot 100 and comprises a robot body 110, a drive unit 130 in the form of electrically powered wheels, a controller 140, a robot arm 120 attached to the robot body 110, and a convertible and versatile multi-use platform 10 attached at a top to the robot body 110. The controller 140 controls the general operation of the mobile robot 100 and may, in some embodiments, also control some aspects of a conversion of the multi-use platform 10.

Further, the mobile robot comprises a plurality of optical scanners 150 (e.g., cameras, LiDAR scanners, etc.,) that can be used by the controller 140 for monitoring the environment of the mobile robot 100, for example while providing an autonomous navigation of the mobile robot 100 within an environment. The navigation may be implemented by any suitable method. The present invention is not concerned with such a navigation or with the general operation of the mobile robot 100 but rather with the multi-use platform 10 and the interaction of the mobile robot 100 with the multi-use platform 10. Therefore, the navigation and the general operation of the mobile robot 100 will not be described in detail.

The multi-use platform 10 is attached to the robot body 110 by attachment elements 27, here in the form of beams, such that it is vertically distanced from the top of the robot body 110. However, the multi-use platform 10 may also be attached by any other means. The multi-use platform 10 comprises a first (outer) platform element 11 and a second (inner) platform element 12. The first platform element 11 is connected to the robot body 110 via the attachment elements 27, while the second platform element 12 is movably connected to the first platform element 11, such that the second platform element 12 can be moved between different relative arrangements to the first platform element 11.

The multi-use platform 10 can, in general, be converted between at least two configurations or positions. In a first position (as illustrated in FIG. 1), the first platform element 11 and the second platform element 12 together build a substantially closed and flat surface. In a second position, the first platform element 11 and the second platform element 12 together build a functional arrangement, as described further below with regard to specific embodiments.

In the first position, the flat surface may preferably be used as a landing platform for a drone 200 (FIG. 11), but, for example, also as a storage surface for the robot arm 120, or for any other suitable application. The main purpose for the multi-use platform 10 is to be exclusively used by the mobile robot 100 or rather by the robot arm 120 of the mobile robot 100. However, it is, for example, also possible that two mobile robots 100 use the multi-use platform 10 as an exchange platform, e.g., for exchanging tools. A landing platform for a drone 200 is, in particular, useful because an associated drone 200 for the mobile robot 100 may, for example, be in communication with the (preferably autonomous) mobile robot 100 and may assist in certain tasks. For example, the mobile robot 100 may carry such a drone 200 and start it, when necessary, for example for assisting in navigating the mobile robot 100 or for carrying out some operations in greater heights, such as performing optical scans for anomalies such as dents, rivet pull-ins, out-of-contour deformations, blend-outs, and scratches on the top of a fuselage of an aircraft, where the mobile robot cannot be used. The drone 200 may use LiDAR scanners for scanning the landing platform (i.e., the multi-use platform 10 in the first position) prior to landing. For such scans, a flat surface of the landing platform that is as smooth as possible is desirable in order to avoid that the drone 200 aborts a landing approach.

The mobile robot 100 itself may be used in different capacities. For example, the mobile robot 100 may be an inspection robot for performing optical scans for anomalies such as dents, rivet pull-ins, out-of-contour deformations, blend-outs, and scratches on the top of a fuselage of an aircraft or spacecraft. In particular, when the robot implements a navigation system that allows to automatically navigate the robot within an environment, such scans can automatically be correlated with determined positions on the fuselage. Another possible capacity of the mobile robot 100 would be for riveting operations. However, these are just examples. In general, the mobile robot 100 may be used in any suitable application. The exact application of the mobile robot 100 is not important for the present disclosure. However, the above examples illustrate the possible use for the multi-use platform 10. For example, when the mobile robot 100 is an inspection robot that performs optical scans for anomalies, for different types of anomalies different optical scanners (as a type of end effector 20) could be needed. In general, in many applications, switching between different end effectors 20 may be necessary or at least desirable. Further, it could be useful to convert the multi-use platform to carry other objects when the landing platform is not needed at the moment.

Therefore, in general when the drone 200 does not need a landing platform (or if for any other reason no flat surface is needed), the multi-use platform 10 can be converted to a functional arrangement by moving the second platform element 12 to a second position. FIGS. 2 to 10 show different embodiments of the multi-use platform 10 implementing different such functional arrangements. In general, the features of these embodiments can all be combined together.

Figure 2:
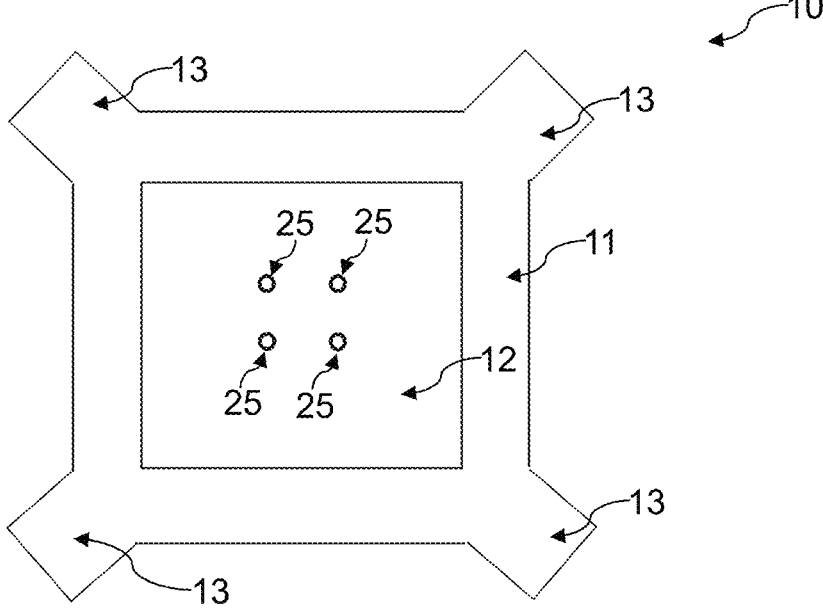
FIG. 2 is a highly schematic top view of a multi-use platform in a first position building a flat surface and having enlarged corner sections for supporting feet of a drone.

FIG. 2 shows a highly schematic top view of a multi-use platform 10. Here, the meaning of the term "outer platform element" for the first platform element 11 becomes clear. The first platform element 11 surrounds the second platform element 12. The second platform element 12 is movably connected to the first platform element 11. In the shown configuration, the first platform element 11 comprises enlarged corner sections 13 for supporting feet of a drone 200, when the multi-use platform 10 is in the first position. This allows, in particular, to enlarge the second platform element 12 and therefore to increase carrying capacity of the multi-use platform 10 since the drone 200 still has enough contact surface with the first platform element 11 because of the enlarged corner sections 13. Although in general the drone 200 may need a flat surface for landing, the drone 200 may in some configurations possibly even land on the multi-use platform 10 when the second platform element 12 is not in the first position, depending on the landing approach used by the drone 200.

FIG. 2 also indicates the gripper receptacles 25 described further below with regard to FIG. 4.

Although the enlarged corner sections 13 in FIG. 2 are illustrated as having a square or rectangular shape, it should be appreciated that the enlarged corner sections may also have any other suitable shape.

Figure 3:
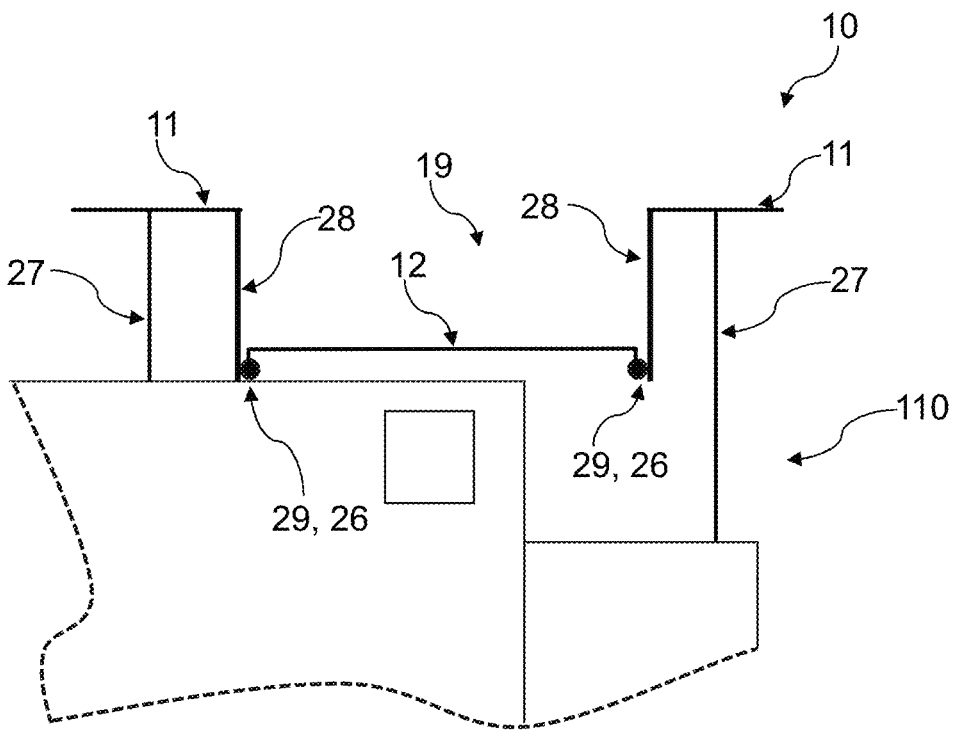
FIG. 3 is a highly schematic representation of a region of the mobile robot of FIG. 1 containing a multi-use platform having a vertically lowerable and liftable second (inner) platform element.

FIG. 3 shows another configuration of the multi-use platform 10. In this configuration, the second platform element 12 can be lowered with regard to the first platform element 11. For this purpose, in the depicted configuration, two rails (or tracks) 28 are additionally attached to the first platform element 11 and run in a vertical direction. The rails 28 can be any kind of rail that is suitable for attaching the second platform element 12 to it in a vertically movable manner. At corresponding positions to the rails 28, the wheels 29 are attached to the second platform element 12 and engage the rails 28. For example, the rails 28 could be toothed rails and the wheels 29 could be toothed wheels that engage the toothed rails. By rotating the wheels 29, the second platform element 12 can be moved relatively to the first platform element 11 in a vertical direction. Vertical movement of the second platform element 12 may occur manually or, for example, by an electrically operable linear actuator 26 (not explicitly shown) that is in contact with the wheels 29. Such an actuator 26 can, for example, be controlled by the controller 140 (FIG. 1). By lowering the second platform element 12, the space between the first platform element 11 and the second platform element 12 (i.e., the built cavity) can, for example, be used by the mobile robot 100 to store items.

FIG. 2 shows the second platform element 12 in a lowered position in which the space between the first platform element 11 and the second platform element 12 can be used, for example, as a transport box 19 for at least temporarily storing items.

It should be appreciated that any other mechanism can be employed that allows for vertical movement of the second platform element 12 with regard to the first platform element 11 and the rail/wheel configuration is only one illustrative example.

Figure 4:
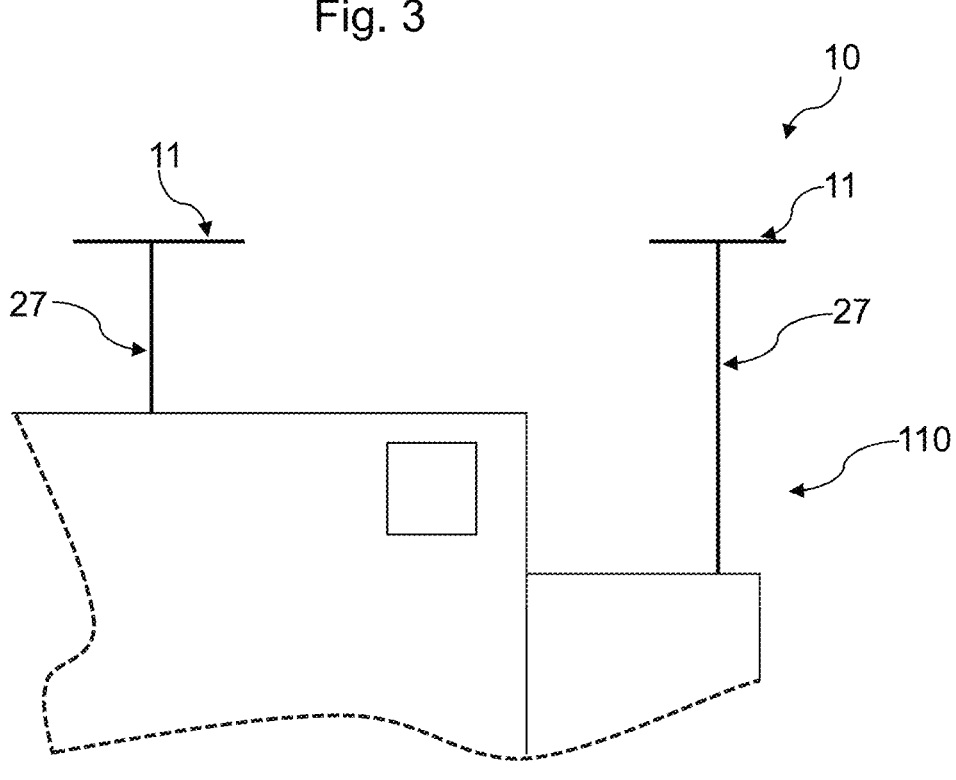
FIG. 4 is a highly schematic representation of the region of the mobile robot of FIG. 1 containing the multi-use platform, wherein the second platform element has been removed.

FIG. 4 shows another configuration, in which the second platform element 12 has been completely removed. In any of the described embodiments herein, the second platform element 12 may be removable in such a way. Complete removal of the second platform element 12 may provide even more storage space and may also allow to carry out service work at the mobile robot 100 without having to completely remove the multi-use platform 10. For removal of the second platform element, corresponding attachment mechanisms (such as the wheel/rail arrangement of FIG. 3 or an attachment to a rotational axis but also any other attachment described herein) can be releasable. The second platform element 12 may be removed manually or, for example, also by means of the robot arm 120. For this, the second platform element 12 may, for example, comprise corresponding gripper receptacles 25, such as corresponding holes or other elements, that can be gripped by the robot arm 120 (gripper receptacles 25 indicated, for example, in FIG. 2, since FIG. 4 does not show the second platform element 12). The gripper receptacles 25 can be any functional elements that can be gripped by the robot arm 120. However, it should be appreciated that it has to be ensured that the surface of the second platform element 12 is flat.

Figures 5, 6:
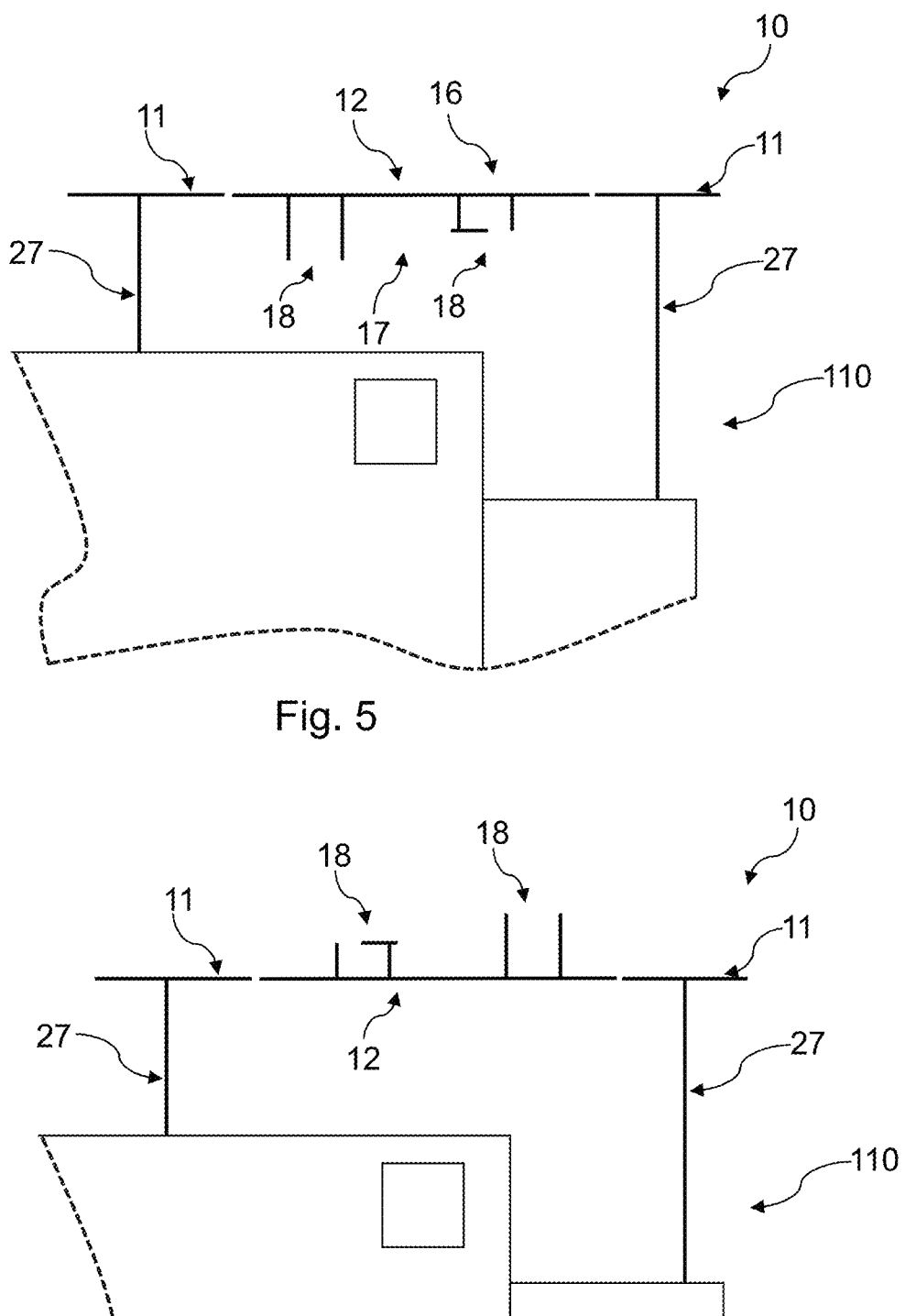
FIG. 5 is a highly schematic representation of the region of the mobile robot of FIG. 1 containing the multi-use platform having holding elements for different end effectors of a robot arm in a first position in which the holding elements face the robot body and the first and second platform elements build a flat surface.
FIG. 6 is a highly schematic representation of the region of the mobile robot of FIG. 1 containing the multi-use platform having holding elements for different end effectors of a robot arm of FIG. 5 in a second position in which the holding elements face upward and are accessible by the robot arm.

FIGS. 5 and 6 show another configuration in which the space between the multi-use platform 10 and the robot body

110 is used as a storage space for different end effectors 20. FIG. 5 shows the second platform element 12 in the first position, in which the first platform element 11 and the second platform element 12 together build a flat surface. FIG. 6 shows the second platform element 12 in the second position, in which the first platform element 11 and the second platform element 12 together build a functional arrangement, in particular for providing the robot arm 120 access to different end effectors 20 (the end effectors 20 itself are not shown in FIG. 6). The second platform element 12 in this configuration comprises a first side 16 and a second side 17. In the first position, the first side 16 is arranged at the top and the second side 17 is arranged opposite the first side 16 and facing the robot body 110. The first side is flat. The second side 17 is provided with holding elements 18 for attaching different end effectors 20 to them. The holding elements 18 are configured to hold the end effectors 20 in position and attached to the second platform element 12, even if it is in the first position, as shown in FIG. 5. When the mobile robot 100 needs another end effector 20 attached to the robot arm 120, the second platform element can be brought into the second position as shown in FIG. 6. In the second position, the second side 17 is arranged at the top and the first side 16 faces the robot body 110. Hence, the holding elements 18 are accessible by the robot arm 120. The robot arm 120 may therefore grab and attach one of the end effectors 20 held by the holding element 18. For example, one of the holding elements 18 (in particular, one corresponding to an end effector 20 currently mounted to the robot arm 120) can be empty. The robot arm 120 may first put down the currently mounted end effector 20 onto this holding element 18 and attach it to the corresponding holding element 18. Afterwards, the robot arm may mount another end effector 20 from another holding element 18. The second platform element 12 may then stay in the second position or may be brought back into the first position in order to, for example, provide a landing platform for a drone.

Although shown in FIG. 6 as the base of the second platform element 12 being at the same height as the first platform element 11, it should be appreciated that the embodiment of FIGS. 5 and 6 may also be combined with any other embodiment described herein, such that, for example, the second platform element 12 may additionally also be displaceable/lowerable in the vertical direction (FIG. 3), such that the second platform element 12 may (in particular in the arrangement of FIG. 6) also be lowered with regard to the first platform element 11.

Figure 7:
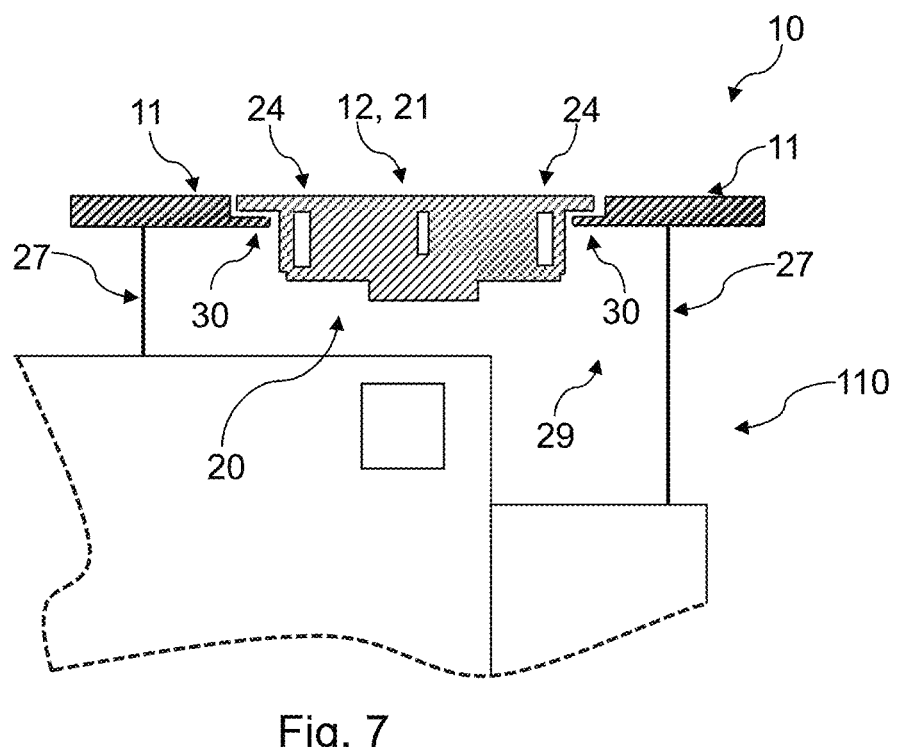
FIG. 7 is a highly schematic representation of the region of the mobile robot of FIG. 1 containing another alternative multi-use platform where the second platform element is an end effector itself, in a first position in which a flat backside of the end effector together with the first platform element build a flat surface.
Figure 8:
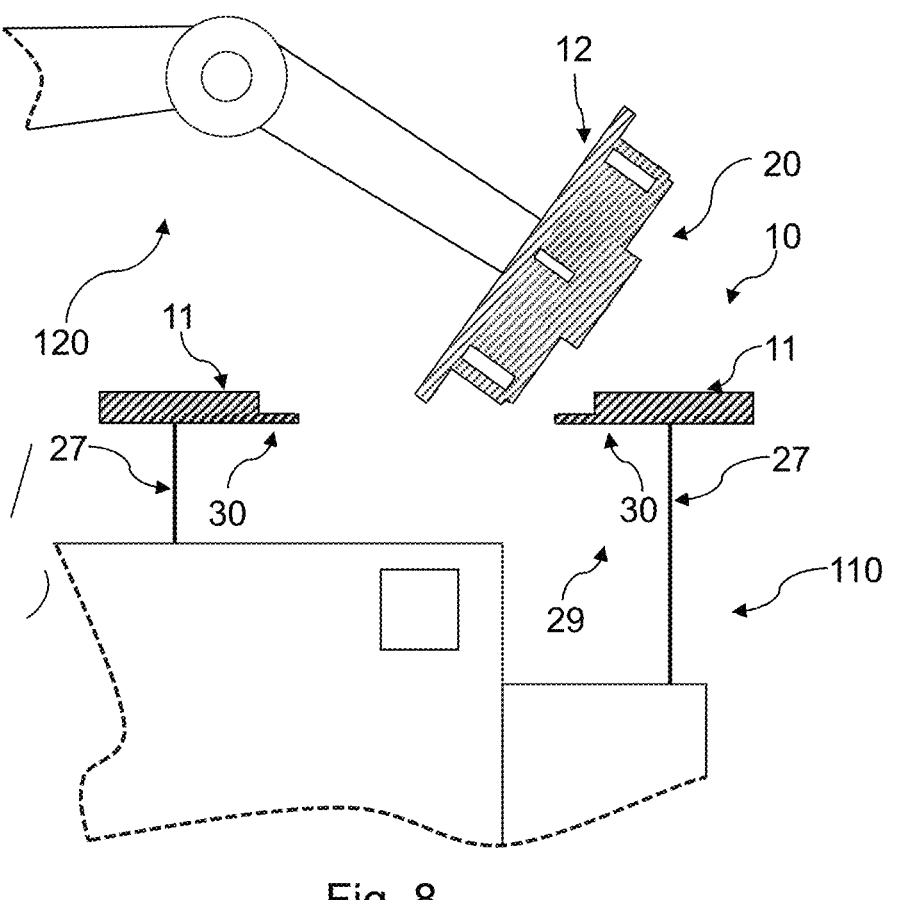
FIG. 8 is a highly schematic representation of the region of the mobile robot of FIG. 1 containing the multi-use platform of FIG. 7, where the second platform element is an end effector itself, after the robot arm has taken the end effector.

FIGS. 7 and 8 show another configuration, in which the second platform element 12 is not a dedicated platform element, but rather is built by at least one end effector 20 itself. FIG. 7 shows the multi-use platform 10 in the first position. The end effector 20 has a flat backside 21 which, in the first position shown in FIG. 7 together with the first platform element 11 is the flat surface of the multi-use platform 10. In the shown configuration, the first platform element 11 may have an inner stepped contour 30. The inner stepped contour 30 is in the form of an edge groove that serves to support an outer contour of the end effector 20, such that the end effector 20 lies onto the first platform element 11. In particular, the inner stepped contour 30 is dimensioned such that in the first position shown in FIG. 7, the flat backside 21 of the end effector 20 is flush with the top surface of the first platform element 11. The end effector 20 comprises locking elements 24 configured to be engaged by the robot arm 120 (FIG. 8), such that the robot arm 120 can take up the end effector 20 and attach it. Instead of only one end effector 20, the second platform element 12 may also correspond to multiple end effectors 20 that are formed complementary such that their flat backsides 21 form a flat surface.

Figure 9:
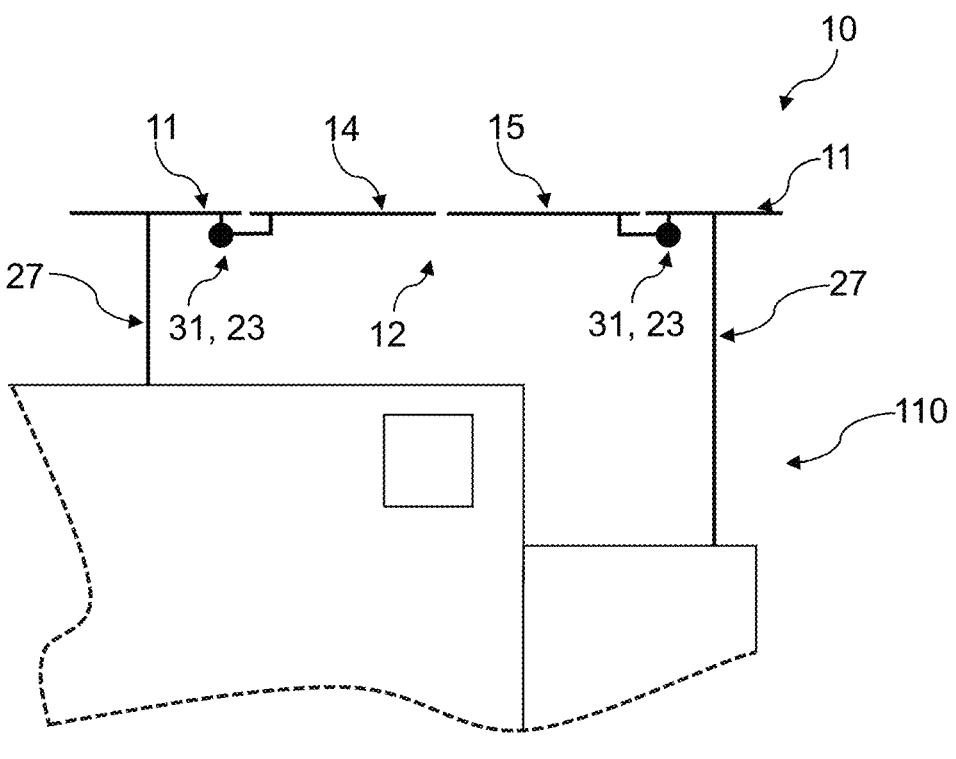
FIG. 9 is a highly schematic representation of the region of the mobile robot of FIG. 1 containing another alternative multi-use platform, in which the second platform element is a two-part element having two flap like sub-elements that are hingedly connected to the first sub-element and that can be pivoted between open and closed positions.

FIG. 9 shows configuration of a multi-use platform 10, in which the second platform element 12 is a two-part element having a first sub-element 14 and a second sub-element 15. The first sub-element 14 and the second sub-element 15 are both hingedly connected to the first platform element 11 by means of hinges 31. The hinges 31 may be coupled to an electrically operable pivoting actuator 23 (not explicitly shown) such as a corresponding electric motor that can be controlled by the controller 140 (FIG. 1) for pivoting the sub-elements between an open and a closed position. FIG. 9 shows the second platform element 12 in the closed position, in which both sub-elements 14, 15 are in a flush position with each other and the first platform element 11. This corresponds to the first position of the multi-use platform 10, in which the first platform element 11 and the two sub-elements 14, 15 of the second platform element 12 are all flush with each other and build the flat surface. In an open position (not shown), the sub-elements 14, 15 are pivoted downwards, such that the space between the multi-use platform 10 and the robot body 110 becomes accessible and can, for example, be used as a storage space.

Figure 10:
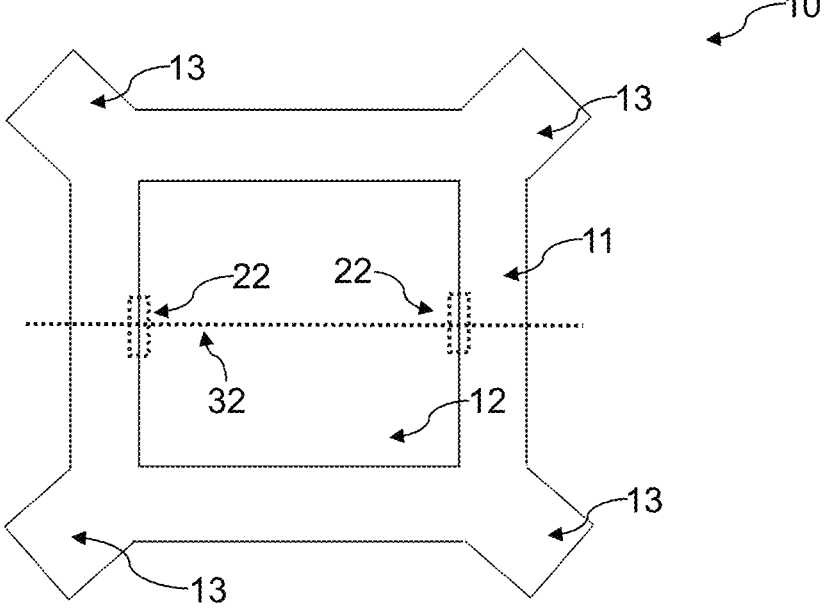
FIG. 10 is a highly schematic top view representation of a multi-use platform where the second platform element is rotatable to switch between the first and second positions.

FIG. 10 shows a configuration, in which the second platform element 12 is rotatable with regard to the first platform element 11 around a rotational axis 32. The rotational axis 32 runs in one of the extension directions of the second platform element 12 and separates the second platform element 12 into two equally spaced parts. The second platform element 12 can be symmetrically rotated around the rotational axis 32. For example, a rod or another rotational connection between the first platform element 11 and the second platform element 12 may allow such a rotation. By rotating the second platform element 12 around the rotational axis 32, the second platform element 12 can be rotated between the first position and the second position. Such a rotating configuration can, for example, also be used together with the configuration described with regard to FIGS. 5 and 6 to rotate the second platform element 12 between the configuration in which the first side 16 is on top and configuration in which the second side 17 carrying the holding elements 18 is on top. However, the rotating configuration of FIG. 10 can be used with any of the embodiments described herein where this is technically possible. Schematically, two rotating devices 22 are indicated by dashed lines. The rotating devices 22 can be any device that allows to actuate the rotating movement. For example, the rotating devices 22 may be at least one electric motor or other actuator (including manual mechanical actuators) that allows rotation of the second platform element 12 with regard to the first platform element 11.

Figure 11:
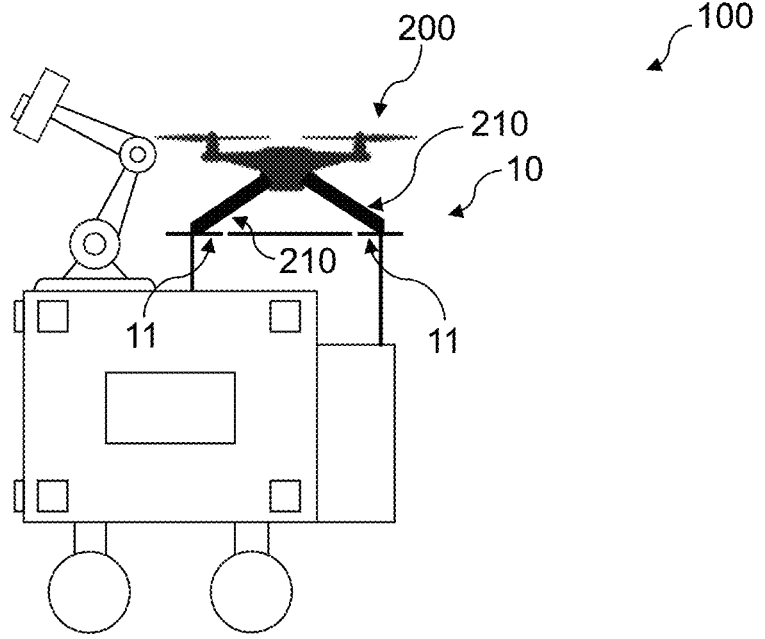
FIG. 11 is a schematic example scenario in which a drone has landed onto the multi-use platform that is in the first position and thereby builds a flat surface.

FIG. 11 shows an example of a mobile robot 100 having a multi-use platform 10 that is currently in the first position in which the first platform element 11 and the second platform element 12 build a flat surface. The flat surface is used as a landing platform for a drone 200. The drone 200 has landed onto the platform, such that the feet 210 of the drone 200 rest on the first platform element 11 (for example on the enlarged corner sections 13, if provided). The flat surface may, in particular, be necessary to ensure that a LiDAR scanner of the drone can accurately detect the landing platform.

The systems and devices described herein may include a controller, such as controller 140, control unit, control device, controlling means, system control, processor, computing unit or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

It should be noted that "comprising" or "including" does not exclude other elements or steps, and "one" or "a" does not exclude a plurality. It should further be noted that features or steps that have been described with reference to any of the above embodiments may also be used in combination with other features or steps of other embodiments described above. Reference signs in the claims are not to be regarded as limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 multi-use platform
11 first platform element, outer platform element
12 second platform element, inner platform element
13 enlarged corner sections
14 first sub-element of second platform element
15 second sub-element of second platform element
16 first side of second platform element
17 second side of second platform element
18 holding elements
19 transport box
20 end effector
21 flat backside
22 rotating device
23 pivoting actuator
24 locking elements
25 gripper receptacle
26 linear actuator
27 attachment elements
28 rails or tracks
29 toothed wheels, flat wheels
30 stepped contour
31 hinges
32 rotational axis
100 (autonomous) mobile robot
110 robot body
120 robot arm
130 drive unit
140 controller
150 optical scanners (cameras, LiDAR scanner)
200 drone
210 feet of the drone

The invention claimed is:

1. A mobile robot comprising:
a robot arm attached to a robot body; and,
a multi-use platform comprising:
a first platform element; and
a second platform element;
wherein the first platform element is fixedly attachable to the robot body of the mobile robot;
wherein the second platform element is movable relative to the first platform element between at least a first position and a second position;
wherein in the first position, the second platform element and the first platform element together build a flat surface;
wherein in the second position, the first platform element and the second platform element together build a functional arrangement; and wherein the second platform element is configured to move independently of the robot arm.

2. The mobile robot of claim 1,
wherein the first platform element is an outer platform element, and
wherein the second platform element is an inner platform element, such that the outer platform element surrounds the inner platform element.

3. The mobile robot of claim 1, wherein the first platform element comprises enlarged corner sections, such that the first platform element builds a landing surface for a drone that is configured to support feet of the drone.

4. The mobile robot of claim 3, wherein the enlarged corner sections have a square or rectangular shape.

5. The mobile robot of claim 1, wherein the second platform element is removable.

6. The mobile robot of claim 5, wherein the second platform element comprises at least one gripper receptacle which is configured to be engaged by the robot arm of the autonomous mobile robot to remove the second platform element by the robot arm.

7. The mobile robot of claim 1,
wherein the second platform element is a two-part element having a first sub-element and a second sub-element that are each hingedly connected to the first platform element, such that the first sub-element and the second sub-element can be pivoted between a closed position and an open position;
wherein the closed position corresponds to the first position of the second platform element; and
wherein the open position corresponds to the second position of the second platform element.

8. The mobile robot of claim 7, further comprising an electrically operable pivoting actuator;
wherein the first sub-element and the second sub-element are connected to the electrically operable pivoting actuator; and
wherein the electrically operable pivoting actuator is configured to selectively move the first sub-element and the second sub-element between the closed position and the open position.

9. The mobile robot of claim 1,
wherein the second platform element has a first side and a second side opposite the first side, wherein the first side is a flat side, which, in the first position, together with the first platform element builds the flat surface; and
wherein the second side comprises holding elements for different end effectors.

10. The mobile robot of claim 9, wherein the second platform element is configured to be rotated such that the second side is facing upwards and the end effectors mounted to the holding elements are accessible by the robot arm.

11. The mobile robot of claim 1,
wherein the second platform element is lowerable with regard to the first platform element; and
wherein, when in the second position, the second platform element is in a lowered position, such that a transport box is built between the first platform element and the second platform element.

12. The mobile robot of claim 11, further comprising an electrically operable linear actuator which is configured for selectively lowering and lifting the second platform element between the first position and the second position.

13. The mobile robot of claim 1, wherein the second platform element comprises at least one end effector for a robot arm, each of the at least one end effectors having a flat backside which, in the first position, together with the first platform element build the flat surface.

14. The mobile robot of claim 13, wherein the flat backside of the at least one end effector comprises locking elements to enable the robot arm to automatically pick up the end effector and attach it to the robot arm.

15. The mobile robot of claim 1, wherein the second platform element is rotatably connected to the first platform element by a rotating device that is configured to rotate the second platform element between the first position and the second position around a rotational axis.

16. The mobile robot of claim 15, wherein the rotating device is electrically operable for selectively rotating the second platform element between the first position and the second position.

17. The mobile robot of claim 1, further comprising:
    a first rail and a second rail, the first rail and the second rail each attached to the first platform element and extending in a vertical direction.

* * * * *